(12) United States Patent
Kim (10) Patent No.: US 7,966,042 B2
(45) Date of Patent: Jun. 21, 2011

(54) AUTOMATIC SETUP SYSTEM AND METHOD OF UBICELL BASE STATION

(75) Inventor: Hee-Gu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 839 days.

(21) Appl. No.: 11/979,939

(22) Filed: Nov. 9, 2007

(65) Prior Publication Data

US 2008/0139249 A1 Jun. 12, 2008

(30) Foreign Application Priority Data

Dec. 8, 2006 (KR) ........................ 10-2006-0124720

(51) Int. Cl.
*H04M 1/00* (2006.01)

(52) U.S. Cl. ...................... 455/561; 455/444; 455/435.1; 455/443; 455/448; 455/454; 455/524

(58) Field of Classification Search ............... 455/435.1, 455/443, 446, 448, 454, 524, 561, 444; 370/328, 370/338
See application file for complete search history.

(56) References Cited

U.S. PATENT DOCUMENTS

| | | | | |
|---|---|---|---|---|
| 2005/0143007 A1* | 6/2005 | Guy et al. | ................ | 455/41.3 |
| 2005/0191991 A1* | 9/2005 | Owen et al. | ................ | 455/411 |
| 2007/0268516 A1* | 11/2007 | Bugwadia et al. | ........... | 358/1.15 |
| 2008/0298275 A1* | 12/2008 | De Sousa | ..................... | 370/255 |
| 2008/0304439 A1* | 12/2008 | Keevill et al. | ................ | 370/328 |

FOREIGN PATENT DOCUMENTS

| | | |
|---|---|---|
| JP | 2001-527327 | 12/2001 |
| JP | 2003-196190 | 7/2003 |

* cited by examiner

*Primary Examiner* — Kwasi Karikari
(74) *Attorney, Agent, or Firm* — H.C. Park & Associates, PLC (57) ABSTRACT

A Ubicell base station includes a Ubicell base station, one or more Ubicell core network elements, and an integrated management server. The Ubicell base identifies position information thereof using a GPS module, and at a time of setup, provides environment setting information including the position information thereof. Each Ubicell core network element, upon receiving environment setting information of an arbitrary Ubicell base station, generates an environment construction information file of the arbitrary Ubicell base station, registers the arbitrary Ubicell base station, and sends the environment construction information file to the arbitrary Ubicell base station. The integrated management server identifies the Ubicell core network element in a corresponding position based on the environment setting information, provided from the Ubicell base station, and provides the environment setting information of the Ubicell base station to the Ubicell core network element.

19 Claims, 8 Drawing Sheets

AUTOMATIC SETUP SYSTEM AND METHOD OF UBICELL BASE STATION

CLAIM OF PRIORITY

This application makes reference to, incorporates the same herein, and claims all benefits accruing under 35 U.S.C. §119 from an application for AUTOMATIC SETUP SYSTEM AND METHOD OF UBICELL BASE STATION earlier filed in the Korean Intellectual Property Office on 8 Dec. 2006 and there duly assigned Serial No. 10-2006-124720.

BACKGROUND OF THE INVENTION

1. Field of the Invention

The present invention relates to an automatic setup system and method of a Ubicell base station.

2. Description of the Related Art

Currently, when a new base station is established in a general mobile communication network such as a macro network, the new base station should be notified of information related to surrounding base stations.

The base station to be newly established is notified of correct position information such as latitude/longitude information of the new base station and has configuration information (e.g., environment information and construction information) of the surrounding base station. In the process of establishing the new base station, an operator should intervene.

In a current x Digital Subscriber Line (xDSL) network and its variations or a cable network, a subscriber is provided with a wide area network service such as an Internet service using a modulator-demodulator (modem). When the subscriber moves to another area, he/she first requests for service termination in the present area, and contacts a service provider to send a registration request for the same service after the movement.

Ubicell was recently developed by Samsung and works by connecting to a mobile carrier's network using user's home broadband connection, creating a mini-cell in the user's home. The Samsung UbiCell is basically a mini "private" base station allowing only a limited number of mobile stations to be connected to it. The Ubicell leverages Access Point Base Station technology, sometimes known as a femtocell, to improve mobile coverage in the home.

In the case of a Ubicell base station, the service provider cannot identify correct position information for installation. Thus, in a typical macro network, any technologies related with base station establishment cannot notify the Ubicell base station of surrounding base station information. When the subscriber does not notify the service provider of home address because of privacy, or fails to notify the service provider of correct home address or correct position information (latitude/longitude information) despite of correct home address at the time of service request, the subscriber cannot be provided with a normal Ubicell service because some incorrect information is given to the service provider.

The Ubicell service is a mobile communication service using a service supported by existing wide area networks (xDSL/cable modem).

That is, the subscriber is provided with the Ubicell service separately from the wide area network service.

However, when the Ubicell service is applied with the same procedures as the macro networks, following problems can take place.

First, additional cost for the service provider (e.g., termination/registration of the Ubicell service) can be charged.

Second, the service operator can erroneously input wrong values for the Ubicell base station.

SUMMARY OF THE INVENTION

The present invention has been made to solve the foregoing problems with the prior art and it is therefore an object of the present invention to provide an automatic setup system and method, which can automatically conduct the same service without an intervention of a service provider when a Ubicell base station is automatically set up (in a plug and play method) or moves to another area.

Another object of the invention is to prevent an operator from setting value errors, shorten a setting time, and facilitate maintenance when a Ubicell environment is established.

According to an aspect of the invention for realizing the above objects, the automatic setup system of a Ubicell base station includes a Ubicell base station, which identifies position information thereof using a Global Positioning System (GPS) module, and at a time of setup, provides environment setting information including the position information thereof; one or more Ubicell core network elements, each of which, upon receiving environment setting information of an arbitrary Ubicell base station, generates an environment construction information file of the arbitrary Ubicell base station, registers the arbitrary Ubicell base station, and sends the environment construction information file to the arbitrary Ubicell base station; and an integrated management server, which identifies the Ubicell core network element in a corresponding position based on the environment setting information, provided from the Ubicell base station, and provides the environment setting information of the Ubicell base station to the Ubicell core network element.

Here, the Ubicell core network element judges whether or not the position information of the Ubicell base station is changed based on the environment setting information of the Ubicell base station, provided from the Ubicell base station through the integrated management server, and the registered environment construction information file of the Ubicell base station, and if the position information of the Ubicell base station is changed, transmitting setting-change information of the Ubicell base station to the integrated management server.

Preferably, the setting-change information of the Ubicell base station includes the environment setting information of the Ubicell base station, which is already registered in the Ubicell core network element.

Preferably, when the setting-change information of the Ubicell base station is received from the Ubicell core network element, the integrated management server provides the setting-change information of the Ubicell base station to another Ubicell core network element, where the Ubicell base station is positioned.

Preferably, the Ubicell core network element includes: a security manager, which, upon receiving the environment setting information received from the Ubicell base station through the integrated management server, generates an environment construction information file of the Ubicell base station, stores the generated environment construction information file, and sends the environment construction information file to the Ubicell base station; a file memory, which stores and manages the environment construction information file, generated by the security manager; and a position information identifier, which, upon receiving the environment setting information through the integrated management server, identifies whether or not the received environment setting information is stored in the file memory, if the received environment setting information is stored, judges whether or not the position information of the Ubicell base station is equal, and if the position information is different, transmits the setting-change information of the Ubicell base station to the integrated management server.

Here, the Ubicell base station includes: the GPS module; and a data processor, which, at a connection to the Ubicell core network element, transmits the environment setting information including the position information of the Ubicell base station to the integrated management server.

According to another aspect of the invention for realizing the above objects, the automatic setup method of a Ubicell base station includes: at a Ubicell base station, when connected through an IP network, identifying position information thereof using a GPS module, and transmitting environment setting information including the position information thereof to an integrated management server; at the integrated management server, identifying a position of the Ubicell base station based on the environment setting information, received from the Ubicell base station, and transmitting the environment setting information of the Ubicell base station to a Ubicell core network element in a corresponding position; at the Ubicell core network element, receiving the environment setting information of the Ubicell base station through the integrated management server, and judging whether or not an environment construction information file of the Ubicell base station is registered; at the Ubicell core network element, if the step of judging whether or not an environment construction information file of the Ubicell base station is registered shows that the environment construction information file of the Ubicell base station is not registered, generating and registering the environment construction information file of the Ubicell base station; and at the Ubicell core network element, sending the registered environment construction information file to the Ubicell base station.

Preferably, automatic setup method can further include: at the Ubicell core network element, if the step of judging whether or not an environment construction information file of the Ubicell base station is registered shows that the environment construction information file of the Ubicell base station is registered, judging whether or not the registered position information of the Ubicell base station is different from the received position information of the Ubicell base station; at the Ubicell core network element, if the step of judging whether or not the registered position information of the Ubicell base station is different from the received position information of the Ubicell base station shows that the registered position information of the Ubicell base station is different from the received position information of the Ubicell base station, transmitting setting-change information of the Ubicell base station to the integrated management server and deleting the registered environment setting information of the Ubicell base station; and at the integrated management server, transmitting the setting-change information of the Ubicell base station to a second Ubicell core network element in a position, to which the Ubicell base station has moved, so that the environment setting information of the Ubicell base station is registered in the second Ubicell core network element.

Preferably, the automatic setup method can further include: at the second Ubicell core network element, upon receiving the setting-change information of the Ubicell base station, re-registers the environment setting information of the Ubicell base station, and providing the re-registered environment setting information to the Ubicell base station.

According to a further aspect of the invention for realizing the above objects, the automatic setup system of a Ubicell base station includes steps of: a Ubicell base station, an integrated management server and one or more Ubicell core network elements, wherein the Ubicell base station transmits initial connection information, and upon receiving an IP address of a corresponding one of Ubicell core network elements, transmits environment setting information to the corresponding Ubicell core network element matching the received IP address; wherein the integrated management server, upon receiving the initial connection information from the Ubicell base station, identifies the corresponding Ubicell core network element in a corresponding position, and sending the IP address of the corresponding Ubicell core network element to the Ubicell base station; and wherein each of the Ubicell core network elements, upon receiving the environment setting information from the Ubicell base station, generates an environment construction file of the Ubicell base station, and registers the Ubicell base station.

Here, the initial connection information of the Ubicell base station includes position information, identified using a GPS module.

Preferably, the initial connection information of the Ubicell base station includes IP address information of the corresponding Ubicell core network element if the Ubicell base station is registered in the corresponding Ubicell core network element.

Preferably, the integrated management server, upon receiving the initial connection information, identifies whether or not the IP address information of the corresponding Ubicell core network element is included in the initial connection information, and if the IP address information of the corresponding Ubicell core network element is not included, provides the Ubicell base station with IP address information of a second Ubicell core network element in an area matching the position information included in the initial connection information.

Preferably, the integrated management server, if the IP address information of the corresponding Ubicell core network element is included, sends the initial connection information, received from the Ubicell base station, to the corresponding Ubicell core network element.

Preferably, the corresponding Ubicell core network element, upon receiving the initial connection information from the integrated management server, compares the initial connection information with the position information of the Ubicell base station, stored in the environment construction information file of the registered Ubicell base station, and if the position information of the Ubicell base station is different, transmits setting-change information of the Ubicell base station and terminates the registration of the Ubicell base station.

Preferably, the integrated management server, upon receiving the setting-change information of the Ubicell base station from the corresponding Ubicell core network element, provides the Ubicell base station with an Ubicell core network element IP address where the Ubicell base station is positioned.

Preferably, the Ubicell core network element includes: a security manager, which, upon receiving the environment setting information from the Ubicell base station through the integrated management server, generates the environment construction information file of the Ubicell base station; a file manager, which generates and manages the environment information file, generated by the security manager; and a position information identifier, which, upon receiving the position information of the Ubicell base station, identifies whether or not the environment construction information file of the Ubicell base station is stored in the file manager, and if the environment construction information file of the Ubicell base station is stored, transmitting the setting-change information of the Ubicell base station to the integrated management server.

According to a yet another aspect of the invention for realizing the above objects, the automatic setup method of a Ubicell base station includes steps of: at a Ubicell base station, when connected through an IP network, transmitting initial connection information including position information, identified using a GPS module, to an integrated management server; at the integrated management server, judging whether or not information of a first Ubicell core network element is included in the received initial connection information of the Ubicell base station; at the integrated management server, if the step of judging whether or not information of a first Ubicell core network element is included in the received initial connection information of the Ubicell base station shows that the information of the first Ubicell core network element is not included, identifying a position of the Ubicell base station based on the position information included in the received initial connection information of the Ubicell core network, and providing the Ubicell base station with an IP address of a second Ubicell core network in a corresponding position; at the Ubicell base station, providing environment setting information to the second Ubicell core network element matching the IP address received from the integrated management server; and at the second Ubicell core network element, registering an environment construction information file of the Ubicell base station based on the environment setting information of the Ubicell base station, and sending the environment construction information file to the Ubicell base station.

Preferably, the automatic setup method can further include: at the integrated management server, if the step of judging whether or not information of a first Ubicell core network element is included in the received initial connection information of the Ubicell base station shows that the information of the first Ubicell core network element is included, providing the initial connection information to the first Ubicell core network element; at the first Ubicell core network element, judging whether or not position information in a registered environment construction information file is equal with the received position information of the Ubicell base station; at the first Ubicell core network element, if the step of judging whether or not position information in a registered environment construction information file is equal with the received position information of the Ubicell base station shows that the registered position information file is different from the received position information of the Ubicell base station, transmitting setting-change information of the Ubicell base station to the integrated management server, and deleting the registered environment setting information of the Ubicell base station; at the integrated management server, providing the Ubicell base station with the IP address of the second Ubicell core network element in the corresponding position, identified by the Ubicell base station based on the initial connection information; at the Ubicell base station, providing the environment setting information to the second Ubicell core network element based on the IP address received from the integrated management server; and at the second Ubicell core network element, re-registering the environment construction information file of the Ubicell base station based on the environment setting information of the Ubicell base station, and sending the environment construction file to the Ubicell base station.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

An automatic setup system and method of a Ubicell base station of the present invention will now be described more fully hereinafter with reference to the accompanying drawings, in which preferred embodiments thereof are shown. However, it shall be apparent to those skilled in the art that system constructions to be described hereinafter will be taken for the illustrative purposes only but not intended to be limiting the present invention.

Figure 1:
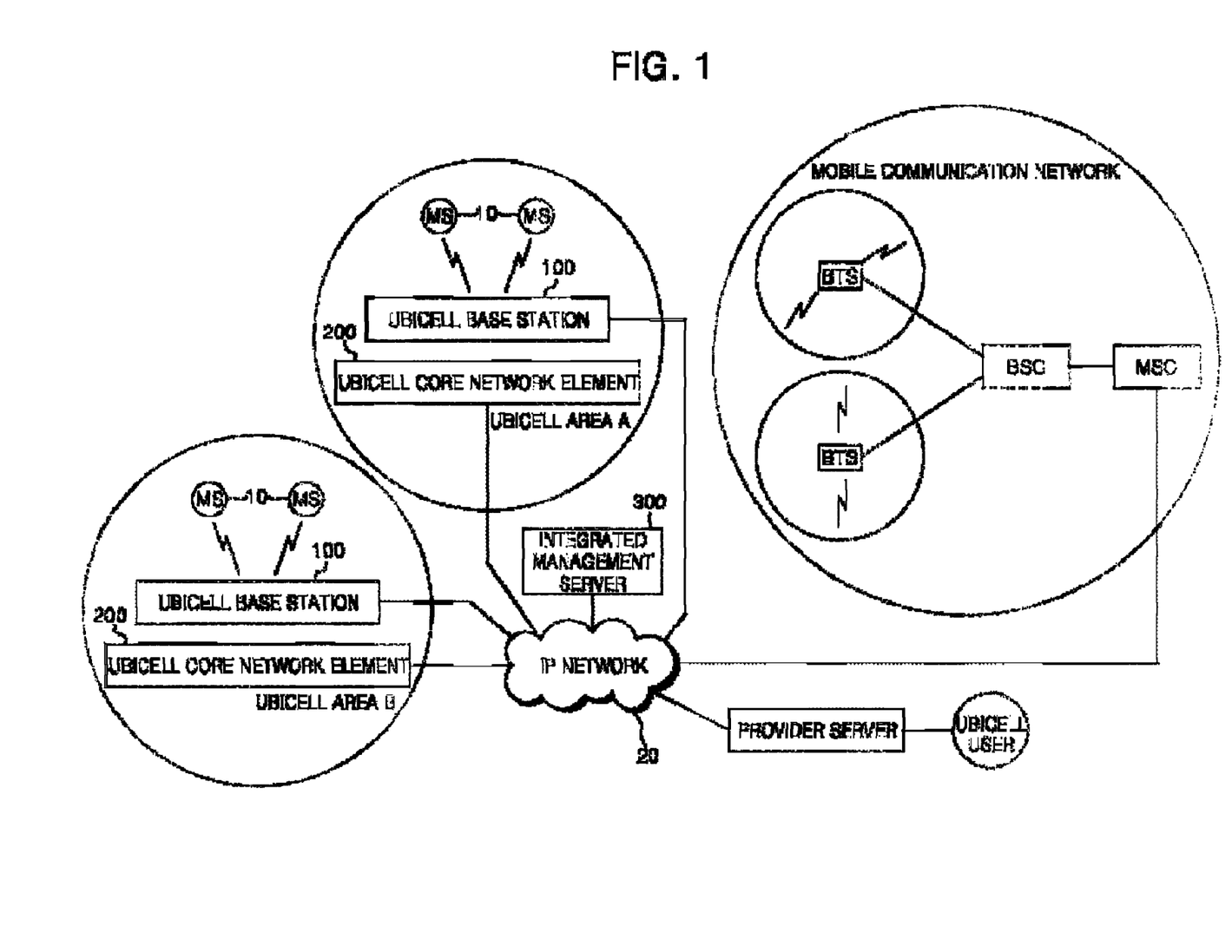
FIG. 1 is a functional block diagram illustrating an automatic setup system of a Ubicell base station according to the invention.

FIG. 1 is a functional block diagram illustrating an automatic setup system of a Ubicell base station according to the invention. The automatic setup system of the invention includes one or more Ubicell base stations 100, one or more Ubicell core network elements 200 and an integrated management server 300.

Each of the Ubicell base stations 100 locates its own position using a Global Positioning System (GPS) module 110 (FIG. 2), and when it is set up, sends environment information including its own position information to a corresponding Ubicell core network element 200 through the integrated management server 300.

The Ubicell base station 100 converts IP packet data, received from the Internet Protocol (IP) network 20, into Wideband Code Division Multiple Access (WCDMA) mobile communication data to conduct WCDMA communication with mobile communication terminals 10. Also, the Ubicell base station 100 converts WCDMA mobile communication data, received from the mobile communication terminals 10 in the WCDMA communication, into IP packet data, and transmits the converted IP packet data to the IP network 20.

The Ubicell base station 100 does not produce signals with the same power as a general micro Base Transceiver Station (BTS). The signals of the Ubicell base station have a low power and a small capacity, which are optimized for a small indoor area such as a home and a Small Office/Home Office (SOHO).

The Ubicell base station 100 can be suitably provided in areas where existing macro infrastructures are weak. Accordingly, the Ubicell base station 100 also includes a digital signal process and an Radio Frequency (RF) signal processor, which are not shown in the drawing, to provide the WCDMA communication to the mobile communication terminals 10.

The Ubicell base station 100 consists of an aFA/Omni carrier and a small capacity system for processing at least four (4) user traffics.

At the setup of the Ubicell base station 100, the Ubicell core network element 200 generates an environment construction information file of the Ubicell base station 100 based on environment setting information, transmitted from the Ubicell base station 100. Then, the Ubicell core network element 200 registers the Ubicell base station 100, and sends the environment construction information file to the Ubicell base station 100.

Figure 2:
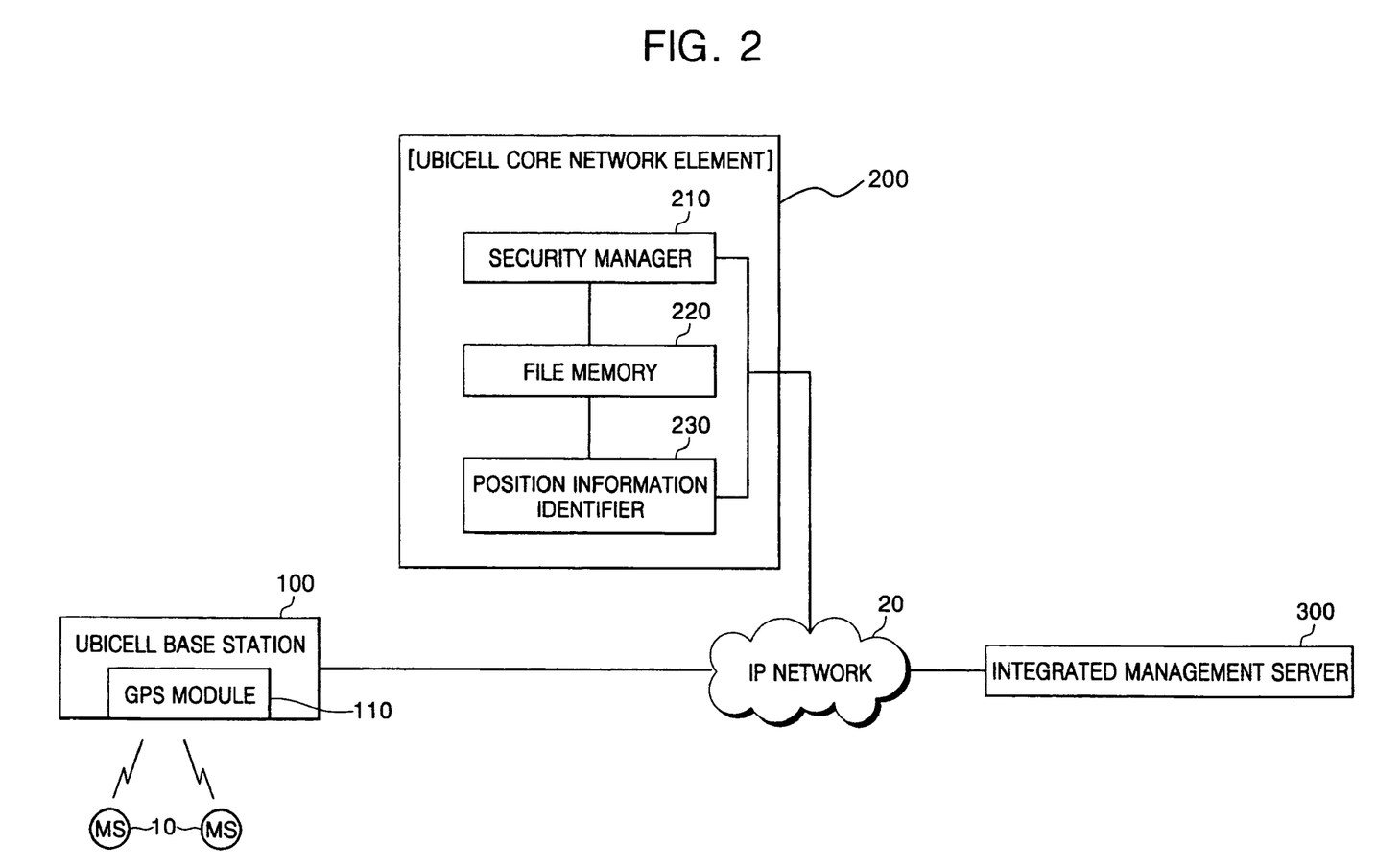
FIG. 2 is a functional block diagram illustrating a sub construction of a Ubicell core network element of the automatic setup system of a Ubicell base station shown in FIG. 1.

As shown in FIG. 2, the Ubicell core network element 200 includes a security manager 210, a file memory 220 and a position information identifier 230. Here, the environment construction information file includes surrounding base station information on base stations around the Ubicell base station 100.

When the environment setting information is received from the Ubicell base station 100 via the integrated management server 300, the security manager 210 of the Ubicell core network element 200 generates and stores the environment construction information file of the Ubicell base station 100 and, at the same time, sends the environment construction information file to the Ubicell base station 100. The security manager 210 acquires the surrounding base station information necessary for the setup of the Ubicell base station 100 by identifying the position information of the Ubicell base station 100 included in the environment setting information, and thus generates the environment construction information file of the Ubicell base station 100.

The file memory 220 of the Ubicell core network element 200 stores and manages the environment construction information file, generated by the security manager 210.

When the environment setting information is received via the integrated management server 300, the position information identifier 230 of the Ubicell core network element 200 identifies whether or not the received environment setting information is stored in the file memory 220. If the received environment setting information is stored, the position information identifier 230 judges whether or not the position information of the Ubicell base station 100 is consistent. If not consistent, the position information identifier 230 transmits setting-change information of the Ubicell base station 100 to the integrated management server 300.

At the setup of the Ubicell base station 100, the integrated management server 300 locates the Ubicell core network element 200 of the present terminal, based on the environment setting information provided from the Ubicell base station 100, provides the IP address of the Ubicell core network element 200 to the Ubicell base station 100, and provides the environment setting information to the Ubicell core network element 200.

When the integrated management server 300 receives the setting-change information of the Ubicell base station 100 from the Ubicell core network element 200, it provides the setting-change information of the Ubicell base station 100 to the Ubicell core network element 200.

Figure 3:
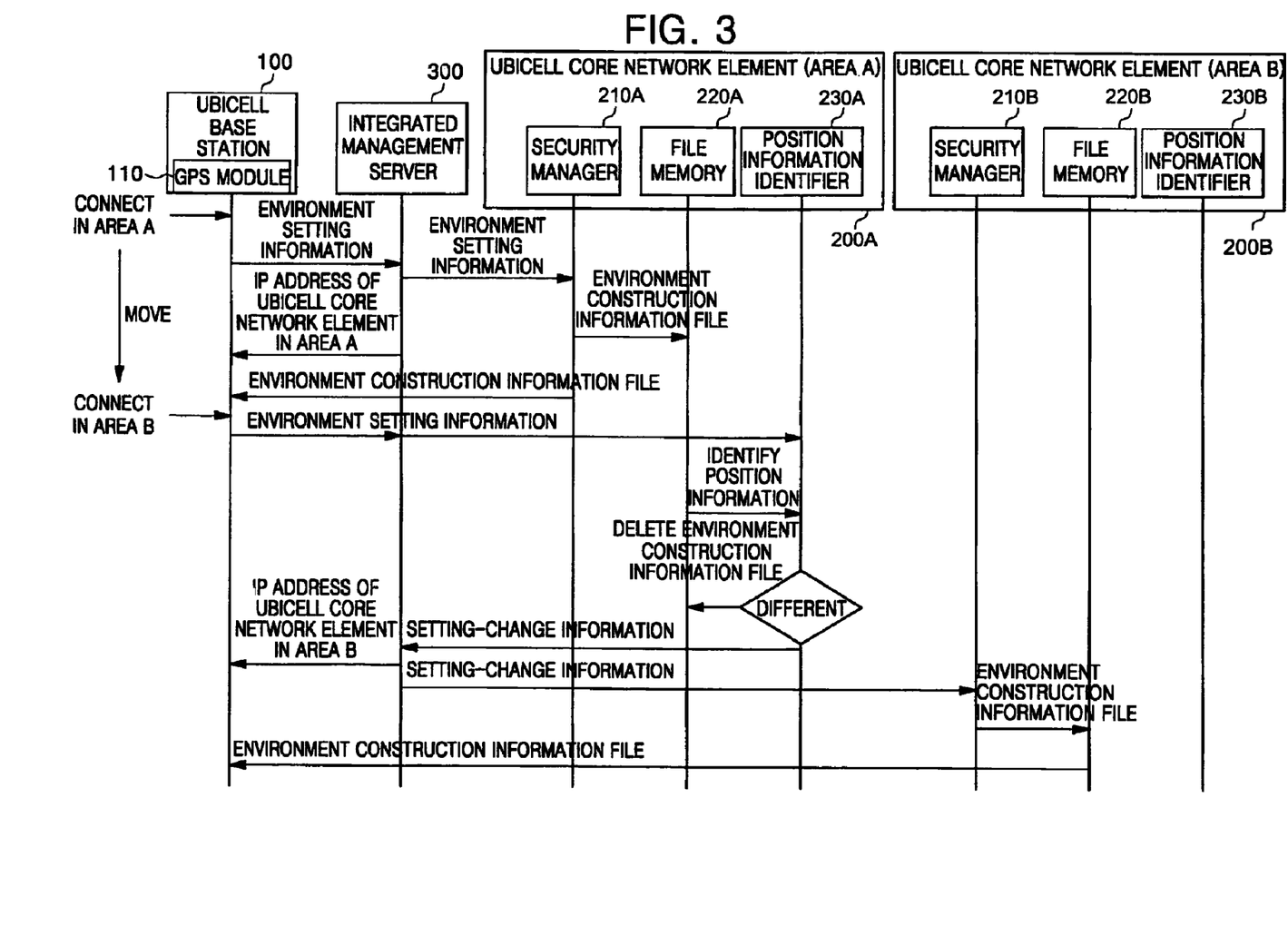
FIG. 3 is a signal flow diagram of an automatic setup system of a Ubicell base station according to a first embodiment of the invention.

Hereinafter, general functions and detailed operations of the above components will not be described but those operations characteristic to the invention will be described with reference to FIG. 3.

First, the Ubicell base station 100 is a system for covering an area that is not serviced by existing mobile communication networks.

Accordingly, the Ubicell base station 100 is placed in a specific area that is not covered by a mobile communication network including base stations and a base station controller, and is connected to the mobile communication network via the IP network 20 (not shown in FIG. 3) in order to support a mobile communication service in this area. The Ubicell base station 100 allows a WCDMA communication to terminals in its service area while conducting an IP packet communication with the mobile communication network via the IP network 20.

The Ubicell base station 100 is physically connected to a first Ubicell core network element 200A in an area A (as shown in FIG. 1) and is turned on in order to connect to the IP network 20, which is connected to the mobile communication network. Next, the Ubicell base station 100 locates its own position using the GPS module 110, and automatically sends environment setting information including its own position information to the integrated management server 300 via the IP network 20. Here, even if the Ubicell base station 100 is physically connected to the first Ubicell core network element 200A, the Ubicell base station 100 cannot provide a Ubicell service to terminals in the area A because the environment setting information of the Ubicell base station 100 is not registered in the first Ubicell core network element 200A of the area A.

The integrated management server 300 locates the position of the Ubicell base station 100 based on the environment setting information, received via the IP network 20 from the Ubicell base station 100. Then, the integrated management server 300 sends the IP address of the first Ubicell core network element 200A to the Ubicell base station 100 and, at the same time, sends the environment setting information to the first Ubicell core network element 200A in the area A.

Upon acquiring the IP address of the first Ubicell core network element 200A from the integrated management server 300, the Ubicell base station 100 judges whether or not a software image and version information, stored in the first Ubicell core network element 200A in the area A, is consistent with its own software image and version information, and if inconsistent, downloads the software image and the version information from the Ubicell core network element 200A in the area A, and stores the downloaded software image and the version information.

The security manager 210A of the first Ubicell core network element 200A in the area A generates an environment construction information file including surrounding base station information using the environment setting information of the Ubicell base station 100, received via the integrated management server 300. Then, the security manager 210A stores the generated environment construction information file in the file memory 220A and sends the environment construction information file to the Ubicell base station 100 in the area A.

The registration of the Ubicell base station 100 is accomplished and a Ubicell service is enabled as the first Ubicell core network element 200A generates and manages the environment setting information of the Ubicell base station 100.

When the Ubicell base station 100, previously connected to the first Ubicell core network element 200A in the area A, is physically connected to a second Ubicell core network element 200B in an area B and is turned on, the Ubicell base station 100 attempts connection to the first Ubicell core network element 200A in the area A, where the Ubicell base station 100 is already registered.

At this time, the Ubicell base station 100 also sends its own position information to the first Ubicell core network element 200A using the GPS module 110.

Then, the position information identifier 230A of the first Ubicell core network element 200A in the area A compares the received position information of the Ubicell base station 100, which is connected again in the area B, with the position information of the Ubicell base station 100 stored in the file memory 220A.

If the position information of the Ubicell base station 100, connected again in the area B, is different from the position information of the Ubicell base station 100, stored in the file memory 220A, the position information identifier 230A of the first Ubicell core network element 200A in the area A transmits setting-change information of the Ubicell base station 100 to the integrated management server 300.

Also, the security manager 210A of the first Ubicell core network element 200A in the area A deletes the environment construction information file of the Ubicell base station 100, connected again in the area B, from the file memory 220A, and thus terminates the registration of the Ubicell base station 100.

Upon receiving the setting-change information of the Ubicell base station 100 from the first Ubicell core network element 200A in the area A, the integrated management server 300 identifies the position information of the Ubicell base station 100, which is connected in the area B, based on the setting-change information of the Ubicell base station 100. Then, the integrated management server 300 sends the setting-change information to the security manager 210B of the second Ubicell core network element 200B in the area B, and at the same time, provides the Ubicell base station 100, connected in the area B, with the IP address of the second Ubicell core network element 200B in the area B. Then, the security manager 210B stores the generated environment construction information file in the file memory 220B, and the environment construction information file is sent to the Ubicell base station 100 in the area B.

Then, the Ubicell base station 100 can be connected to the second Ubicell core network element 200B in the area B based upon the IP address of the second Ubicell core network element 200B in the area B, provided from the integrated management server 300, and conducts registration procedures (plug and play procedures), so that a Ubicell service can be provided in the area B.

Figure 4A:
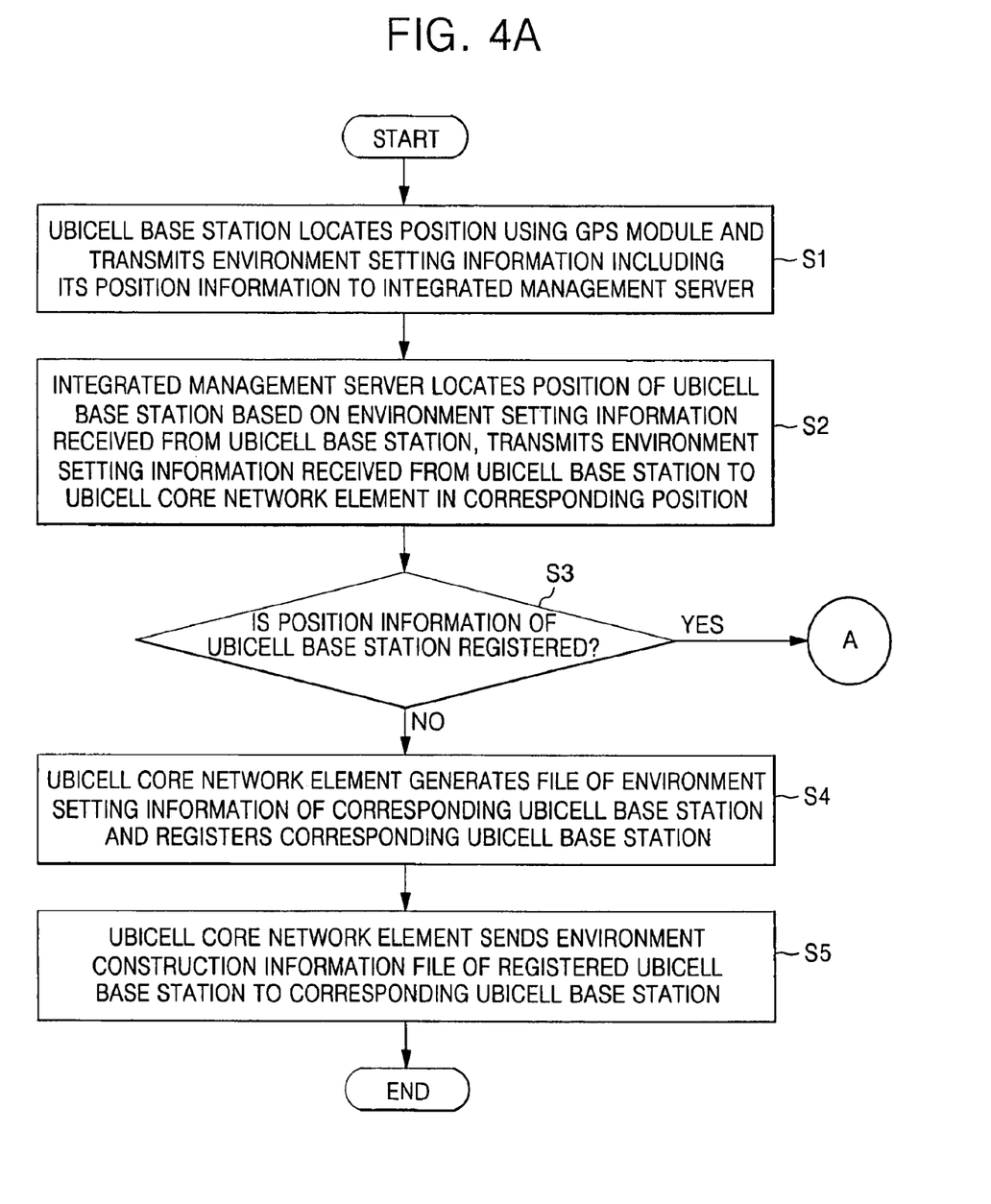
FIGS. 4A and 4B are a flowchart illustrating an automatic setup method of a Ubicell base station according to the first embodiment of the invention.
Figure 4B:
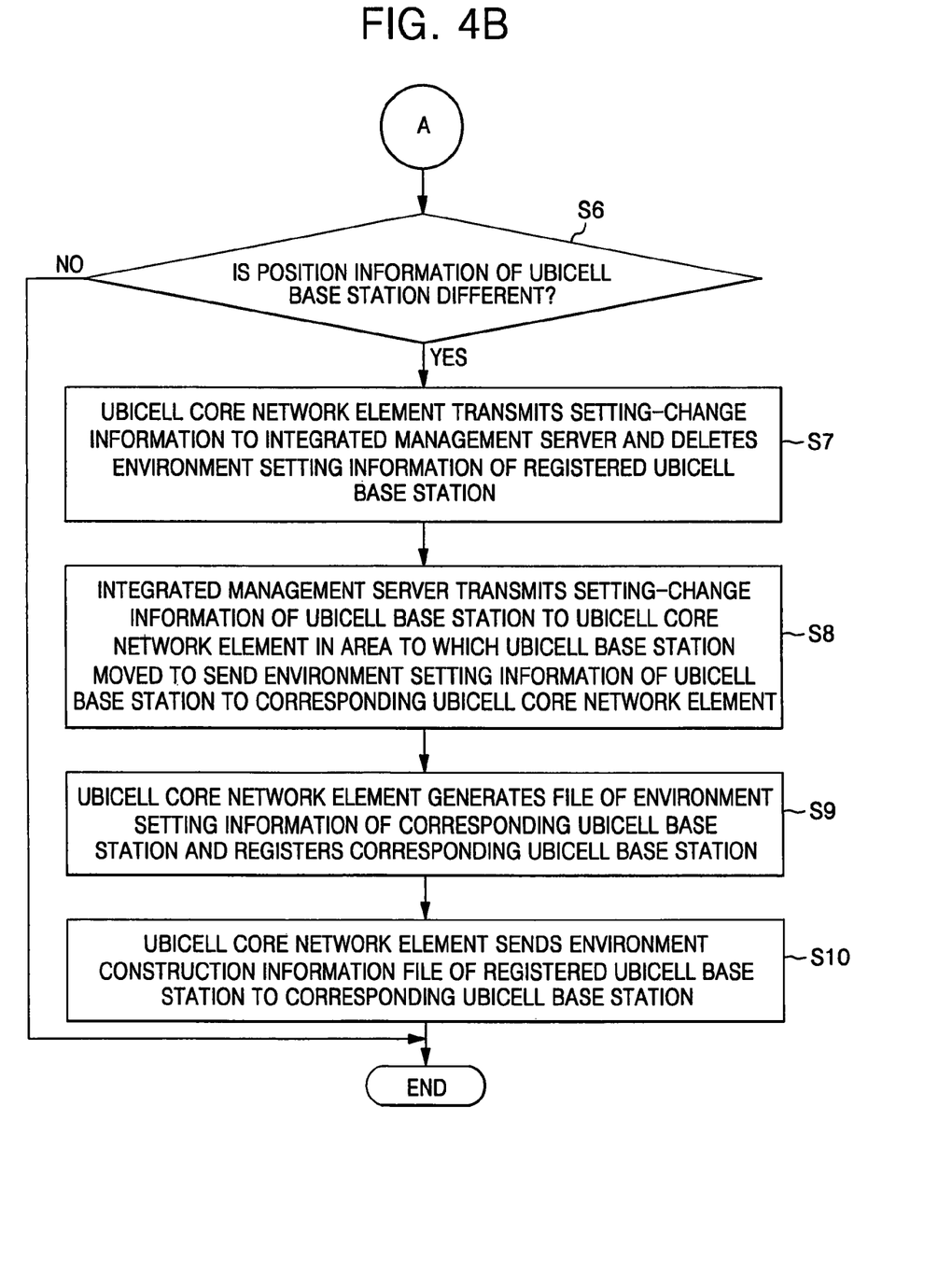

Hereinafter, an automatic setup method of the Ubicell base station as configured above according to the invention will be described with reference to FIGS. 4A and 4B.

First, after being connected via the IP network 20, the Ubicell base station 100 identifies its own position using the GPS module 110, and transmits environment setting information including its own position information to the integrated management server 300 in S1.

In S2, the integrated management server 300 locates the position of the Ubicell base station 100 based on the environment setting information, received from the Ubicell base station 100, and transmits the environment setting information, received from the Ubicell base station 100 to a first Ubicell core network element 200A in a corresponding area.

In S3, the first Ubicell core network element 200A judges whether or not the position information of the Ubicell base station 100 is registered.

If the procedure in S3 shows that the position information of the Ubicell base station 100 is not registered (NO), the first Ubicell core network element 200A generates a file of the environment setting information (or an environment setting information file) of the Ubicell base station 100, and registers the Ubicell base station 100 in S4.

In S5, the first Ubicell core network element 200A sends the environment setting information file of the registered Ubicell base station 100 to the Ubicell base station 100.

If the procedure in S3 shows that the position information of the Ubicell base station 100 is registered (YES), the first Ubicell core network element 200A judges whether or not the registered position information of the Ubicell base station 100 is different from the received position information of the Ubicell base station 100 in S6.

If the process in S6 shows that the registered position information of the Ubicell base station 100 is different from the received position information of the Ubicell base station 100 (YES), the first Ubicell core network element 200A transmits a setting-change information of the Ubicell base station 100 to the integrated management server 300, and at the same time, deletes the environment setting information of the registered Ubicell base station 100 in S7.

In S8, the integrated management server 300 transmits the setting-change information of the Ubicell base station 100 to a second Ubicell core network element 200B in a corresponding area, to which the Ubicell base station 100 has moved, thereby providing the environment setting information of the Ubicell base station 100 to the second Ubicell core network element 200B.

The second Ubicell core network element 200B generates a file of the environment setting information of the Ubicell base station 100, and registers the Ubicell base station 100 in S9.

In S10, the second Ubicell core network element 200B sends the environment setting information file of the registered Ubicell base station 100 to the Ubicell base station 100.

According to the process as described above, the Ubicell base station 100 is connected to the Ubicell core network element 200A, or 200B, to conduct registration procedures (plug and play procedures), and thus a Ubicell service is automatically provided.

Figure 5:
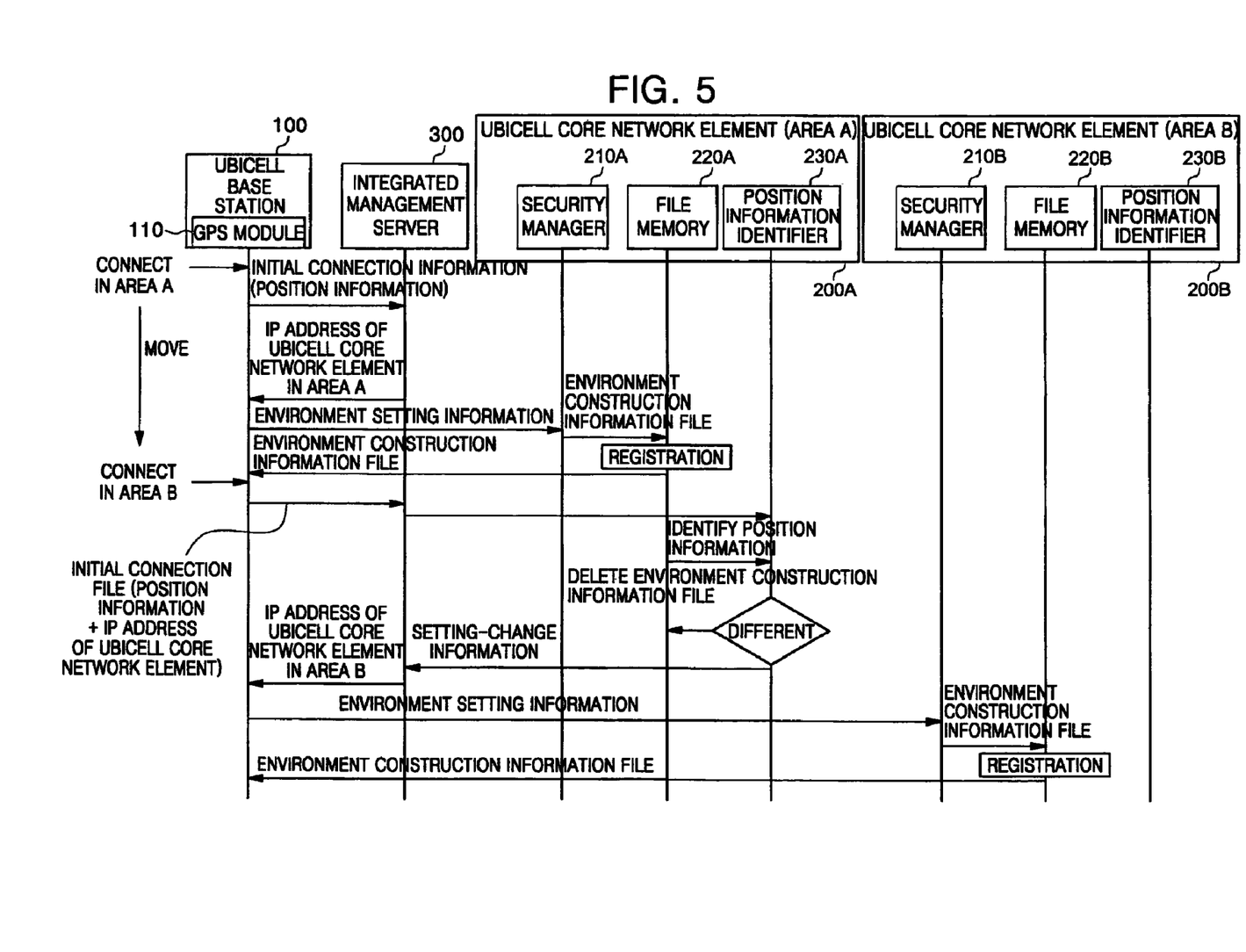
FIG. 5 is a signal flow diagram of an automatic setup system of a Ubicell base station according to a second embodiment of the invention.

An automatic setup system of a Ubicell base station 100 according to a second embodiment of the invention includes one or more Ubicell base stations 100, one or more Ubicell core network elements 200 and an integrated management server 300.

Each of the Ubicell base stations 100 transmits initial connection information to the integrated management server 300. When the IP address of a corresponding Ubicell core network element 200 is provided, the Ubicell base station 100 transmits environment setting information to the corresponding Ubicell core network element 200 of the received IP address. Here, the initial connection information includes position information, identified using the GPS module 110. If the corresponding Ubicell core network element 200 is registered, the initial connection information includes IP address information of the corresponding Ubicell core network element 200. The environment setting information, sent to the corresponding Ubicell core network element 200 from the Ubicell base station 100, includes the position information of the Ubicell base station 100, identified using the GPS module 110.

When the environment setting information is received from the Ubicell base station 100, the corresponding Ubicell core network element 200 generates an environment construction information file of the Ubicell base station 100, and registers the Ubicell base station 100. Upon receiving initial connection information of the Ubicell base station 100, the corresponding Ubicell core network element 200 compares the position information included in the environment construction information file of the registered Ubicell base station 100. If the position information of the Ubicell base station 100 is different, the corresponding Ubicell core network element 200 transmits setting change information of the Ubicell base station 100 to the integrated management server 300, and at the same time, terminates the registration of the registered Ubicell base station 100.

When the integrated management server 300 receives the initial connection information from the Ubicell base station 100, it identifies the new corresponding Ubicell core network element 200 in a corresponding new position and sends the IP address of the new corresponding Ubicell core network element 200 to the Ubicell base station 100. When the integrated management server 300 receives the initial connection information from the Ubicell base station 100, registered in the first corresponding Ubicell core network element 200, it judges whether or not the IP address information of the first corresponding Ubicell core network element 200, included in the initial connection information, exists. If the IP address information is registered, the integrated management server 300 transmits the initial connection information of the Ubicell base station 100 to the first corresponding Ubicell core network element 200. Upon receiving the setting change information of the Ubicell base station 100 from the first corresponding Ubicell core network element 200, the integrated management server 300 provides the Ubicell base station 100 with the IP address of the new corresponding Ubicell core network element 200, where the Ubicell base station 100 is newly positioned.

Here, the initial connection information that the Ubicell base station 100 transmits includes the position information identified using the GPS module 110 and the IP address information of the first corresponding Ubicell core network element 200.

Hereinafter, general functions and detailed operations of the above components will not be described but those operations characteristic to the invention will be described with reference to FIG. 5.

First, the Ubicell base station 100 transmits initial connection information to the integrated management server 300. The initial connection information that the Ubicell base station 100 transmits includes the position information of the Ubicell base station 100, which is identified using the GPS module 110, and IP address information of a Ubicell core network element 200A.

Upon receiving the initial connection information from the Ubicell base station 100, the integrated management server 300 identifies whether or not IP address information of a registered Ubicell core network element 200A is included in the initial connection information. If the IP address information of the registered Ubicell core network element 200A is not included, the integrated management server 300 sends the IP address of a corresponding Ubicell core network element 200A to the Ubicell base station 100.

When the Ubicell base station 100 receives the IP address of the Ubicell core network element 200A from the integrated management server 300, the Ubicell base station 100 transmits environment setting information to the Ubicell core network element 200A matching received IP address.

When the Ubicell core network element 200A receives the environment setting information from the Ubicell base station 100, it generates an environment construction information file of the Ubicell base station 100, and registers the Ubicell base station 100. Here, the environment construction information file of the Ubicell base station 100, generated by the Ubicell core network element 200A, includes surrounding base station information.

When the integrated management server 300 receives the initial connection information from the Ubicell base station 100, it identifies whether or not the initial connection information includes IP address information of a registered Ubicell core network element 200A. If the initial connection information includes the IP address information of the registered Ubicell core network element 200A, the integrated management server 300 transmits the initial connection information of the Ubicell base station 100 to the corresponding Ubicell core network element 200A.

Then, upon receiving the initial connection information, the Ubicell core network element 200A compares the position information of the Ubicell base station 100, stored in the environment construction information file of the registered Ubicell base station 100, with the received position information of the Ubicell base station 100. If the position information of the Ubicell base station 100 is different, the Ubicell core network element 200A transmits setting-change information of the Ubicell base station 100 and terminates the registration of the Ubicell base station 100. Here, the initial connection information of the Ubicell base station 100 includes the position information of the Ubicell base station 100, identified using the GPS module 110, and the IP address information of the Ubicell core network element 200A.

When the integrated management server 300 receives the setting-change information of the Ubicell base station 100 from the Ubicell core network element 200A, it provides the Ubicell base station 100 with the IP address of the Ubicell core network element 200B, where the Ubicell base station 100 is now positioned.

When the Ubicell base station 100 receives the IP address of the Ubicell core network element 200B from the integrated management server 300, it transmits environment setting information to the Ubicell core network element 200B matching received IP address.

Upon receiving the environment setting information from the Ubicell base station 100, the Ubicell core network element 200B generates an environment construction information file of the Ubicell base station 100, and re-registers the Ubicell base station 100. Here, the environment construction information file of the Ubicell base station 100, generated by the Ubicell core network element 200B, includes surrounding base station information.

Figure 6A:
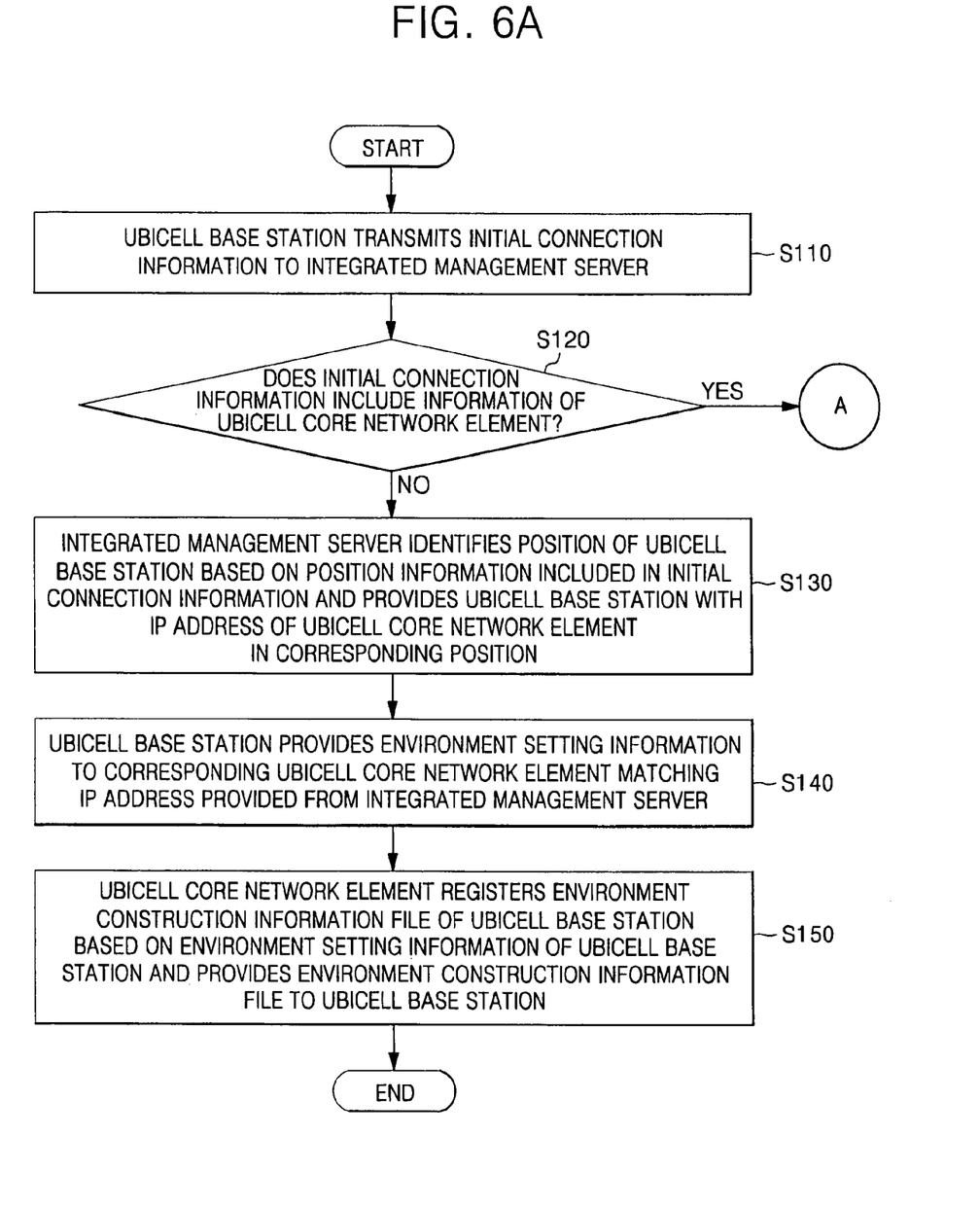
FIGS. 6A and 6B are a flowchart illustrating an automatic setup method of a Ubicell base station according to the second embodiment of the invention.
Figure 6B:
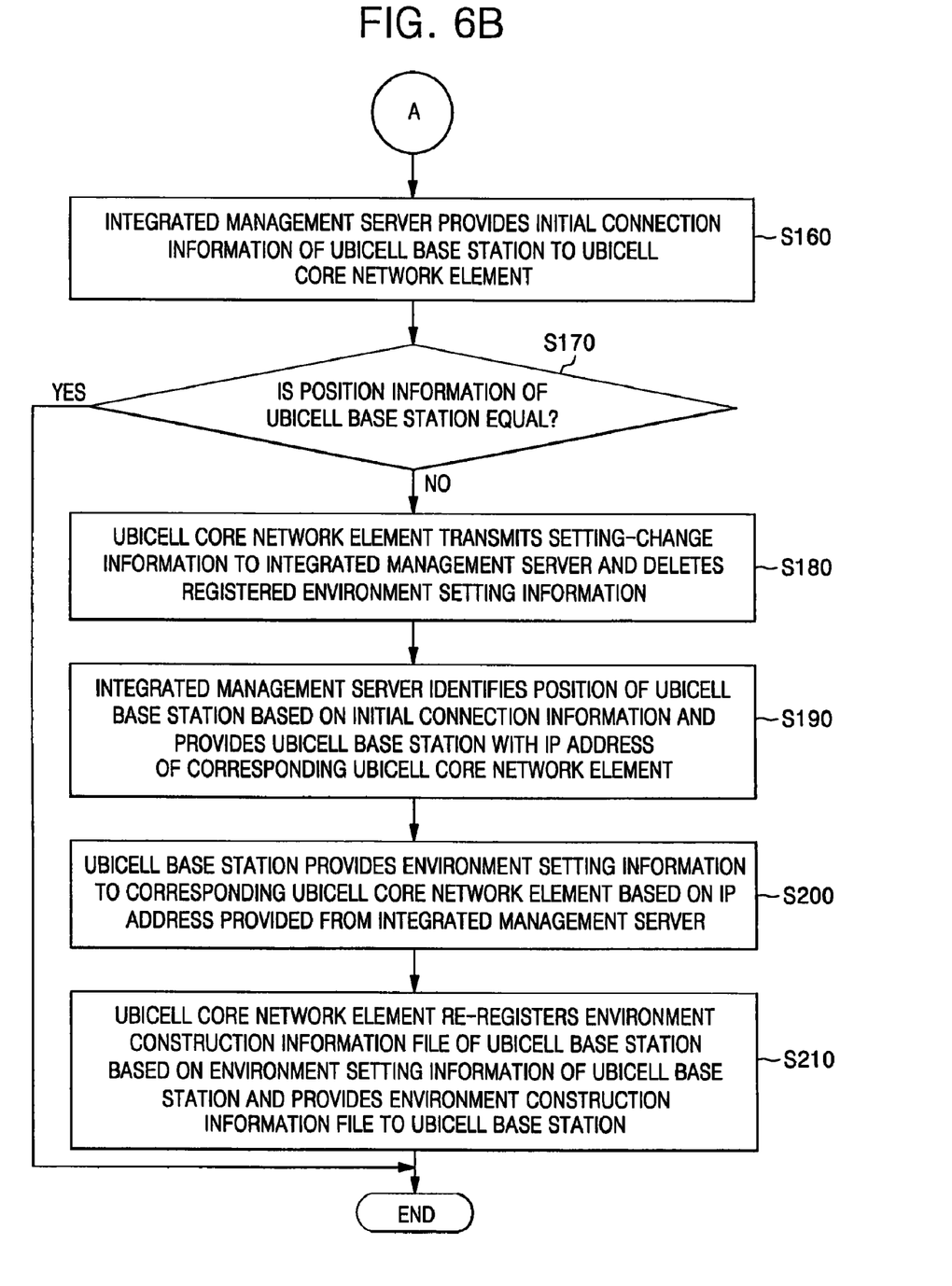

Hereinafter, an automatic setup method of the Ubicell base station as configured above, according to the second embodiment of the invention, will be described with reference to FIGS. 6A and 6B.

First, when the Ubicell base station 100 is physically connected via the IP network 20, it transmits initial connection information to the integrated management server 300 in S110. In S110, the initial connection information includes position information of the Ubicell base station 100, identified using the GPS module 110, and IP address information of a corresponding Ubicell core network element 200A, if the Ubicell base station 100 is registered.

In S120, the integrated management server 300 judges whether or not the initial connection information of the Ubicell base station 100 includes Ubicell core network element information.

If the procedure of S120 shows that the Ubicell core network element information is not included (NO), the integrated management network 300 identifies the position of the Ubicell base station 100 based on the position information, included in the received initial connection information of the Ubicell base station 100, and provides the Ubicell base station 100 with the IP address of a Ubicell core network element 200A in a corresponding position in S130.

In S140, the Ubicell base station 100 sends environment setting information to the corresponding Ubicell core network element 200A by referring to the IP address of the Ubicell core network element 200A, provided through the integrated management server 300.

In S150, the Ubicell core network element 200A registers an environment construction information file of the Ubicell base station 100 based on the environment setting information of the Ubicell base station 100, and sends the environment information file of the Ubicell base station 100 to the Ubicell base station 100.

In the meantime, if the procedure of S120 shows that the Ubicell core network element information is included (YES), the integrated management server 300 sends the initial connection information of the Ubicell base station 100 to the Ubicell core network element 200A in S160.

In S170, the Ubicell core network element 200A judges whether or not the registered position information of the environment construction information file of the Ubicell base station 100 is equal with the position information of the Ubicell base station 100, received through the integrated management server 300.

If the procedure of S170 shows that the registered position information of the environment construction information file of the Ubicell base station 100 is different from the received position information of the Ubicell base station 100 (NO), the Ubicell core network element 200A transmits setting-change information of the Ubicell base station 100 to the integrated management server 300 and deletes the registered environment setting information of the Ubicell base station 100 in S180.

In S190, the integrated management server 300 identifies the position of the corresponding Ubicell base station 100 based on the initial connection information of the Ubicell base station 100, and sends the IP address of the corresponding Ubicell core network element 200B to the Ubicell base station 100.

In S200, the Ubicell base station 100 sends the environment setting information to the corresponding Ubicell core network element 200B by referring to the IP address, provided from the integrated management server 300.

In S210, the Ubicell core network element 200B re-registers the environment construction file of the Ubicell base station 100 based on the environment setting information of the Ubicell base station 100, and then provides the Ubicell base station 100 with the environment construction file thereof.

According to the automatic setup system and method of a Ubicell base station as set forth above, at the time of the setup of the Ubicell base station, correct position information (latitude/longitude information) is notified, through the GPS module of the Ubicell base station, to the Ubicell core network element. Then, the Ubicell core network element can find surrounding base stations, generate environment setting information, and send the environment setting information to the corresponding Ubicell base station in real-time, so that automatic registration can be carried out.

Furthermore, even if the Ubicell base station moves to another area, an operator does not need conduct setup operations but the Ubicell base station can be automatically set up. Accordingly, the present invention ensures excellent mobility in the Ubicell base station.

While the present invention has been shown and described in connection with the preferred embodiments, it will be apparent to those skilled in the art that modifications and variations can be made without departing from the spirit and scope of the invention as defined by the appended claims.

What is claimed is:

1. An automatic setup system of a Ubicell base station, comprising:
   a Ubicell base station to identify position information of the Ubicell base station using a global positioning system module, and to provide environment setting information comprising the position information;
   a Ubicell core network element to generate an environment construction information file of the Ubicell base station upon receiving the environment setting information from the Ubicell base station, to register the Ubicell base station, and to send the environment construction information file to the Ubicell base station; and
   an integrated management server to identify the Ubicell core network element in a corresponding position based on the environment setting information provided from the Ubicell base station, and to provide the environment setting information of the Ubicell base station to the Ubicell core network element.

2. The automatic setup system according to claim 1, wherein the Ubicell core network element judges whether or not the position information of the Ubicell base station is changed based on second environment setting information of the Ubicell base station provided from the Ubicell base station through the integrated management server and the registered environment construction information file of the Ubicell base station, and if the position information of the Ubicell base station is changed, the Ubicell core network element transmits setting-change information of the Ubicell base station to the integrated management server.

3. The automatic setup system according to claim 2, wherein the setting-change information of the Ubicell base station comprises the environment setting information of the Ubicell base station, which is already registered in the Ubicell core network element.

4. The automatic setup system according to claim 3, wherein, when the setting-change information of the Ubicell base station is received from the Ubicell core network element, the integrated management server provides the setting-change information of the Ubicell base station to another Ubicell core network element, where the Ubicell base station is positioned.

5. The automatic setup system according to claim 3, wherein the Ubicell core network element comprises:
   a security manager to receive the environment setting information from the Ubicell base station through the integrated management server, to generate the environment construction information file of the Ubicell base station in response to receiving the environment setting information, and to send the environment construction information file to the Ubicell base station;
   a file memory to store and manage the environment construction information file generated by the security manager; and
   a position information identifier to receive the second environment setting information through the integrated management server, to determine whether or not second position information of the Ubicell base station of the second environment setting information is the same as stored position information of the Ubicell base station, and if the second position information is different, to transmit the setting-change information of the Ubicell base station to the integrated management server.

6. The automatic setup system according to claim 1, wherein the Ubicell base station comprises:
   the global positioning system module; and
   a data processor to transmit, at a connection to the Ubicell core network element, the environment setting information comprising the position information of the Ubicell base station to the integrated management server.

7. An automatic setup method of a Ubicell base station, comprising:
   at a Ubicell base station, when connected through an Internet protocol network, identifying position information of the Ubicell base station using a global positioning system module, and transmitting environment setting information comprising the position information to an integrated management server;

at the integrated management server, identifying a position of the Ubicell base station based on the environment setting information received from the Ubicell base station, and transmitting the environment setting information of the Ubicell base station to a Ubicell core network element in a corresponding position;

at the Ubicell core network element, receiving the environment setting information of the Ubicell base station through the integrated management server, and determining whether or not an environment construction information file of the Ubicell base station is registered;

at the Ubicell core network element, if the step of determining whether or not an environment construction information file of the Ubicell base station is registered indicates that the environment construction information file of the Ubicell base station is not registered, generating and registering the environment construction information file of the Ubicell base station; and at the Ubicell core network element, sending the registered environment construction information file to the Ubicell base station.

8. The automatic setup method according to claim 7, further comprising:

at the Ubicell core network element, if the step of determining whether or not an environment construction information file of the Ubicell base station is registered indicates that the environment construction information file of the Ubicell base station is registered, determining whether or not a registered position information of the Ubicell base station is different from the received position information of the Ubicell base station;

at the Ubicell core network element, if the step of determining whether or not the registered position information of the Ubicell base station is different from the received position information of the Ubicell base station indicates that the registered position information of the Ubicell base station is different from the received position information of the Ubicell base station, transmitting setting-change information of the Ubicell base station to the integrated management server and deleting the registered environment setting information of the Ubicell base station; and at the integrated management server, transmitting the setting-change information of the Ubicell base station to a second Ubicell core network element in a position, to which the Ubicell base station has moved, so that the environment setting information of the Ubicell base station is registered in the second Ubicell core network element.

9. The automatic setup method according to claim 8, further comprising:

at the second Ubicell core network element, upon receiving the setting-change information of the Ubicell base station, registering the environment setting information of the Ubicell base station, and providing the registered environment setting information to the Ubicell base station.

10. An automatic setup system of a Ubicell base station, comprising:

a Ubicell base station, an integrated management server, and at least one Ubicell core network element, wherein the Ubicell base station transmits initial connection information, and upon receiving an Internet protocol address of a corresponding Ubicell core network element, transmits environment setting information to the corresponding Ubicell core network element at the received Internet protocol address;

wherein the integrated management server, upon receiving the initial connection information from the Ubicell base station, identifies the corresponding Ubicell core network element in a corresponding position, and sends the Internet protocol address of the corresponding Ubicell core network element to the Ubicell base station; and wherein the corresponding Ubicell core network element, upon receiving the environment setting information from the Ubicell base station, generates an environment construction file of the Ubicell base station, and registers the Ubicell base station.

11. The automatic setup system according to claim 10, wherein the initial connection information of the Ubicell base station comprises position information obtained using a global positioning system module.

12. The automatic setup system according to claim 11, wherein the initial connection information of the Ubicell base station comprises the Internet protocol address of the corresponding Ubicell core network element if the Ubicell base station is registered in the corresponding Ubicell core network element.

13. The automatic setup system according to claim 12, wherein the integrated management server, upon receiving the initial connection information, identifies whether or not the Internet protocol address information of the corresponding Ubicell core network element is included in the initial connection information, and if the Internet protocol address information of the corresponding Ubicell core network element is not included, the integrated management server provides the Ubicell base station with an Internet protocol address information of a second Ubicell core network element in an area matching the position information included in the initial connection information.

14. The automatic setup system according to claim 13, wherein the integrated management server, if the Internet protocol address information of the corresponding Ubicell core network element is included, sends the initial connection information, received from the Ubicell base station, to the corresponding Ubicell core network element.

15. The automatic setup system according to claim 14, wherein the corresponding Ubicell core network element, upon receiving the initial connection information from the integrated management server, compares the initial connection information with position information of the Ubicell base station stored in the environment construction information file of the registered Ubicell base station, and if the position information of the Ubicell base station is different, the corresponding Ubicell core network element transmits setting-change information of the Ubicell base station and terminates the registration of the Ubicell base station.

16. The automatic setup system according to claim 15, wherein the integrated management server, upon receiving the setting-change information of the Ubicell base station from the corresponding Ubicell core network element, provides the Ubicell base station with an Ubicell core network element Internet protocol address corresponding to an area where the Ubicell base station is positioned.

17. The automatic setup system according to claim 10, wherein the Ubicell core network element comprises:

a security manager to receive the environment setting information from the Ubicell base station through the integrated management server, and to generate the environment construction information file of the Ubicell base station in response to receiving the environment setting information;

a file memory to store and manage the environment information file generated by the security manager; and a position information identifier to receive the position information of the Ubicell base station, to determine whether or not the received position information of the Ubicell base station is the same as position information stored in the file manager, and if the received position information of the Ubicell base station is different from the position information stored in the file manager, to transmit the setting-change information of the Ubicell base station to the integrated management server.

18. An automatic setup method of a Ubicell base station, comprising:

at a Ubicell base station, when connected through an Internet protocol network, transmitting initial connection information comprising position information obtained using a global positioning system module to an integrated management server;

at the integrated management server, determining whether or not information of a first Ubicell core network element is included in the received initial connection information of the Ubicell base station;

at the integrated management server, if the step of determining whether or not information of a first Ubicell core network element is included in the received initial connection information of the Ubicell base station indicates that the information of the first Ubicell core network element is not included, identifying a position of the Ubicell base station based on the position information included in the received initial connection information of the Ubicell core network, and providing the Ubicell base station with an Internet protocol address of a second Ubicell core network in a corresponding position;

at the Ubicell base station, providing environment setting information to the second Ubicell core network element at the Internet protocol address received from the integrated management server; and at the second Ubicell core network element, registering an environment construction information file of the Ubicell base station based on the environment setting information of the Ubicell base station, and sending the environment construction information file to the Ubicell base station.

19. The automatic setup method according to claim 18, further comprising:

at the integrated management server, if the step of determining whether or not information of a first Ubicell core network element is included in the received initial connection information of the Ubicell base station indicates that the information of the first Ubicell core network element is included, providing the initial connection information to the first Ubicell core network element;

at the first Ubicell core network element, determining whether or not position information in a registered environment construction information file is the same as the received position information of the Ubicell base station;

at the first Ubicell core network element, if the step of determining whether or not position information in a registered environment construction information file is the same as the received position information of the Ubicell base station indicates that the registered position information file is different from the received position information of the Ubicell base station, transmitting setting-change information of the Ubicell base station to the integrated management server, and deleting the registered environment setting information of the Ubicell base station;

at the integrated management server, providing the Ubicell base station with the Internet protocol address of the second Ubicell core network element identified by the Ubicell base station based on the initial connection information;

at the Ubicell base station, providing the environment setting information to the second Ubicell core network element based on the Internet protocol address received from the integrated management server; and at the second Ubicell core network element, registering the environment construction information file of the Ubicell base station based on the environment setting information of the Ubicell base station, and sending the environment construction file to the Ubicell base station.

* * * * *